United States Patent [19]
Kobayashi et al.

[11] Patent Number: 4,603,316
[45] Date of Patent: Jul. 29, 1986

[54] VIBRATION NOISE SUPPRESSIVE RAIN SENSOR FOR A WIPER CONTROL SYSTEM

[75] Inventors: Kyoji Kobayashi, Chigasaki; Yujiro Tsutsui, Kamakura, both of Japan

[73] Assignees: Nissan Motor Company, Limited; Jidosha Denki Kogyo Kabushiki Kaisha, both of Yokohama, Japan

[21] Appl. No.: 574,142

[22] Filed: Jan. 26, 1984

[30] Foreign Application Priority Data

Jan. 28, 1983 [JP] Japan ................... 58-11484

[51] Int. Cl.$^4$ ............................... B60Q 1/00
[52] U.S. Cl. ................... 340/52 R; 15/250.02; 15/250 C; 73/170 R; 307/10 R; 310/324; 310/345; 318/DIG. 2; 340/602
[58] Field of Search ............ 340/601, 602, 603, 52 R, 340/52 F; 307/10 R, 116; 310/322, 324, 345; 15/250.02, 250.04, 250.12, 250.13, 250.16, 250.17, 250 C; 73/170 R, 170 A, 171; 318/DIG. 2, 443, 444, 448

[56] References Cited
U.S. PATENT DOCUMENTS

| | | | |
|---|---|---|---|
| 3,141,330 | 7/1964 | Murray et al. | 73/170 R |
| 3,264,410 | 8/1966 | Schoenbaum | 340/601 X |
| 3,555,289 | 1/1971 | Sobkow | 307/10 R |
| 4,010,383 | 3/1977 | Grassmann | 307/10 R |
| 4,079,362 | 3/1978 | Grimm et al. | 310/345 X |
| 4,527,105 | 7/1985 | Shiraishi | 318/444 |
| 4,542,325 | 9/1985 | Kobayashi et al. | 318/483 |

Primary Examiner—James L. Rowland
Assistant Examiner—Daniel Myer
Attorney, Agent, or Firm—Schwartz, Jeffery, Schwaab, Mack, Blumenthal & Evans

[57] ABSTRACT

A wiper control system controls an automotive wiper in accordance with rain conditions. Rain conditions are detected by means of a rain sensor which has a vibrator adapted to vibrate at an amplitude corresponding to rain conditions. The vibrator is adapted to produce a sensor signal having an amplitude corresponding to its vibration. The vibrator vibrates at a resonant frequency outside of the audible frequency range and has adequate sensitivity for detecting rain conditions.

14 Claims, 14 Drawing Figures

FIG.10
FIG.11
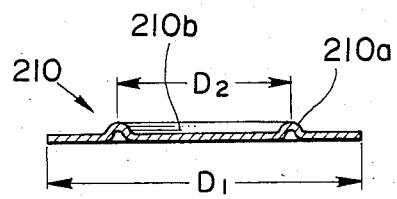
FIG.12
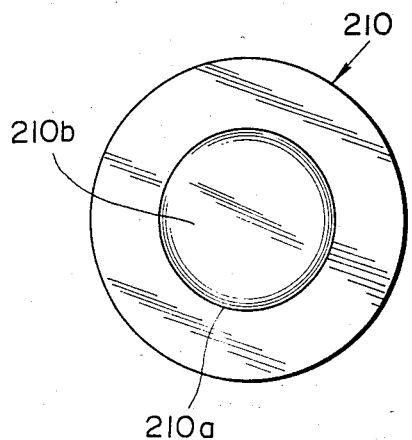
FIG.13
(A)
(PRIOR ART)
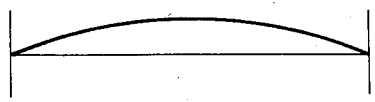
(B)

VIBRATION NOISE SUPPRESSIVE RAIN SENSOR FOR A WIPER CONTROL SYSTEM

BACKGROUND OF THE INVENTION

The present invention relates generally to a rain sensor for detecting rain conditions for controlling operation of a windshield wiper depending upon detected rain conditions. More specifically, the invention relates to a rain sensor having a vibrator vibrating in accordance with rain conditions and with a resonating frequency in a specific frequency range which is out of the range of possible vehicle body vibrations.

In order to control wiper operation, especially to control intermittent wiper operation, rain condition dependent wiper control systems have been proposed and developed. Such rain condition dependent wiper control systems require a rain sensor which detects rain conditions to produce a sensor signal representative of the detected rain conditions. In such rain sensors, a vibration sensor has been used to detect the nature of vibration of a vibrator element onto which rain drops impact. The vibration sensitive rain sensor, however, tends to produce sensor signals in response to vibrations of the vibrator due to vehicle body vibrations caused by engine vibration, road shock and so forth. Since the wiper control system is arranged to respond to the sensor signal to determine the wiper operation depending upon the sensor signal value, the wiper may be driven even when rain is not falling.

In other words, in order to control wiper operation in accurate correspondence to rain conditions, it is necessary to provide a rain sensor which can avoid the influence of vibrations transmitted through the vehicle body. Experimental evidence reveals that the highest possible vibration frequency transmitted through the vehicle body is approximately 9 KHz. Therefore, by realizing a resonant frequency higher than the possible highest vibration frequency, the influence of vibration noises on detection of rain conditions can be satisfactorily avoided. The resonant frequency increases as the thickness of the vibrator increases, while vibration amplitude due to impact of rain drops would decrease. On the other hand, the resonant frequency decreases as the ratio of the thickness of the vibrator to the area thereof decreases, while the vibration amplitude increases.

Therefore, in order to obtain a sufficiently high resonant frequency, the thickness of the vibrator has to be thick enough in relation to the area thereof. On the other hand, in order to ensure sufficient sensitivity of the rain sensor in response to rain drop impact, the vibration amplitude of the vibrator has to be great enough for the vibrator to vibrate even in response to the relatively small impact energy available under relatively light rain conditions.

SUMMARY OF THE INVENTION

Therefore, it is an object of the present invention to provide a rain sensor with a vibrator which has a resonant frequency outside of the frequency range of possible vibrations transmitted through the vehicle body.

Another and more specific object of the invention is to provide a rain sensor with a vibrator with a resonant frequency higher than possible vibration frequency transmitted through a vehicle body to eliminate the influence of vibrations transmitted through the vehicle body.

In order to accomplish the above-mentioned and other objects, a rain sensor according to the present invention includes a vibrator adapted to resonate at a frequency outside of the audible frequency range so that the influence of vehicle body vibrations due to the opening and closing of doors, engine vibrations and so forth may be satisfactorily avoided. Preferably, the resonant frequency of the vibrator should be higher than the audible frequency range.

According to one aspect of the invention, a rain sensor comprises a sensor housing, a vibrator with a sensor surface onto which rain drops can impinge, the vibrator being suspended in the sensor housing for vibration in response to the impact of rain drops onto the sensor surface, the resonant frequency of the vibrator being in a range outside of the vibration frequency range within which vibrations may be transmitted through the vehicle body, and means for converting the vibrator vibrations into electric signals which vary according to the variation of the vibrator vibrations.

BRIEF DESCRIPTION OF THE DRAWINGS

The present invention will be understood more fully from the detailed description given herebelow and from the accompanying drawings of the preferred embodiments, which, however, should not be taken to limit the invention to the specific embodiments but are for explanation and understanding only.

In the drawings:

FIG. 10 is a side view of a vibration plate used in the rain sensor of FIG. 9;

FIG. 11 is a cross-section of the vibration plate of FIG. 10;

FIG. 12 is a plan view of the vibration plate of FIG. 10; and

FIG. 13(A) and (B) are diagrams of the spatial distributions of vibration amplitude across the vibrators of a conventional rain sensor and a rain sensor according to the present invention, respectively.

DESCRIPTION OF THE PREFERRED EMBODIMENTS

Figure 1:
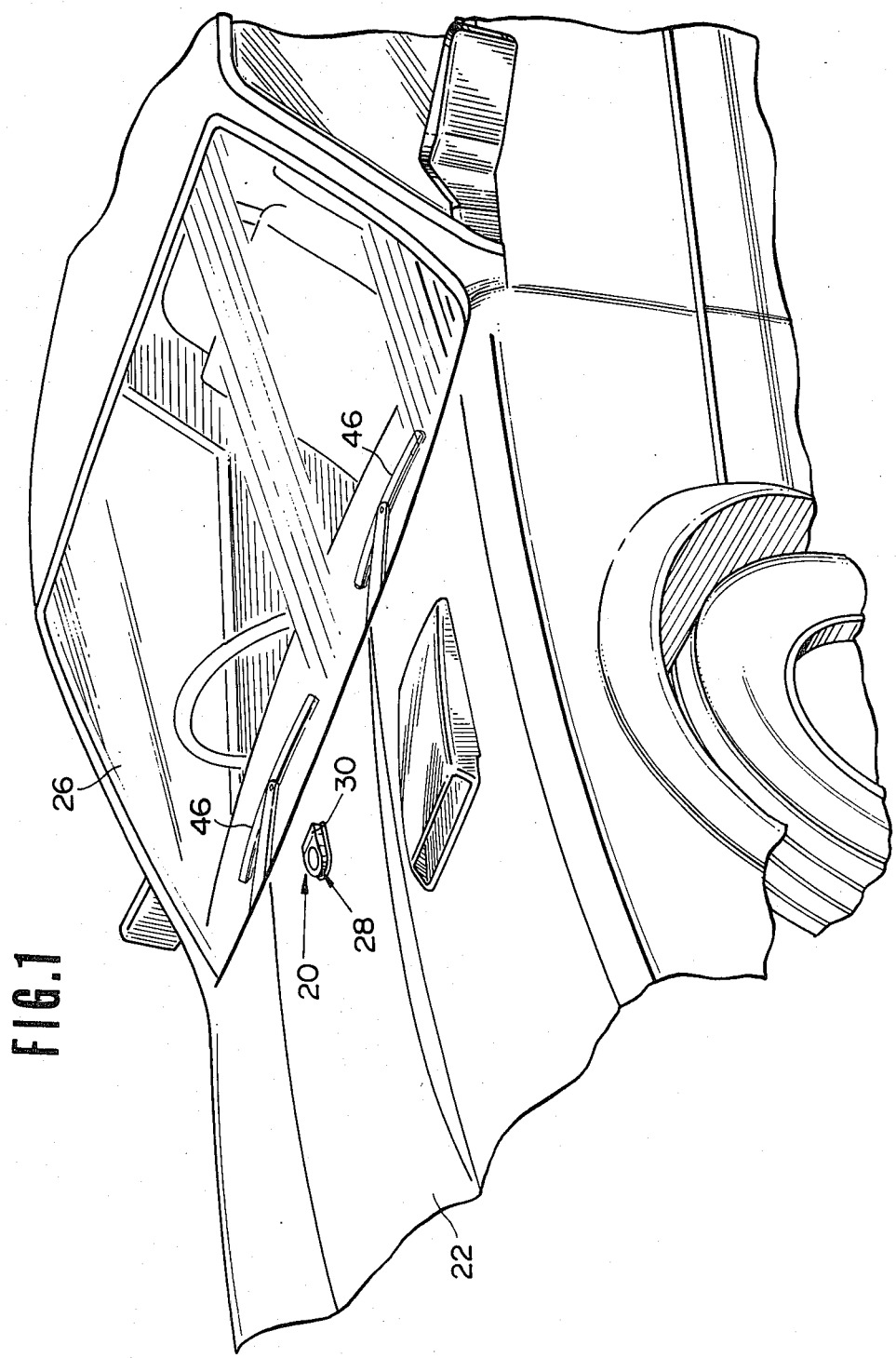
FIG. 1 is a partial perspective view of an automotive vehicle to which a wiper control system according to the present invention is applicable.
Figure 2:
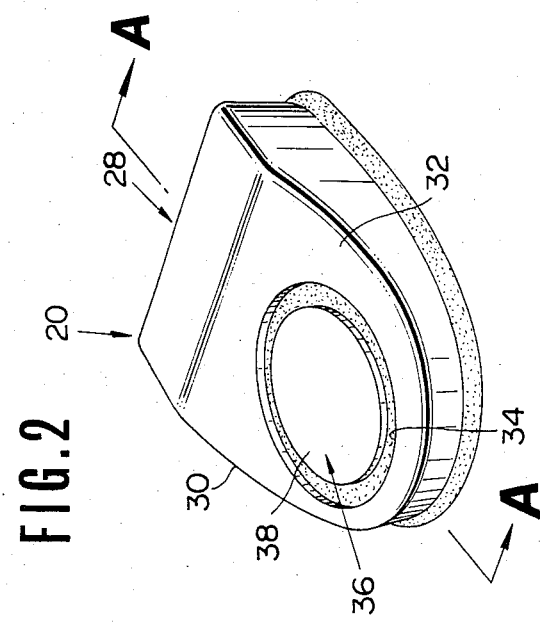
FIG. 2 is an elarged perspective view of a rain sensor in trhe wiper control system.

Referring now to the drawings, particularly to FIGS. 1 and 2, a rain sensor 20 is generally mounted on the engine hood 22 or the cowl top panel near the front windshield 26 in order to detect rain conditions around the windshield. A sensor casing, which is generally represented by the reference numeral "28", has an upper cover member 30. The upper cover member 30 has an upper surface 32 tilted or inclined downwardly towards its front end. The tilt angle of the upper surface 32 of the upper cover member 30 is preferably in the range of about 5° to 25°, which has been experimentarily obtained to maximize sensitivity to rain conditions. A generally circular opening 34 is formed in the upper cover member 30 so that the upper surface 38 of a vibrator, which is generally represented by the reference numeral "36", can be exposed to the atmosphere. The vibrator 36 is elastically suspended from the sensor casing 28 in order to be able to vibrate when rain drops impinge thereupon. The vibrator 36 is adapted to produce a vibration indicative signal having a value which varies in dependence upon the amplitude and frequency of vibration which, in turn, depends upon the force of impact of rain drops onto the vibrator.

Figure 3:
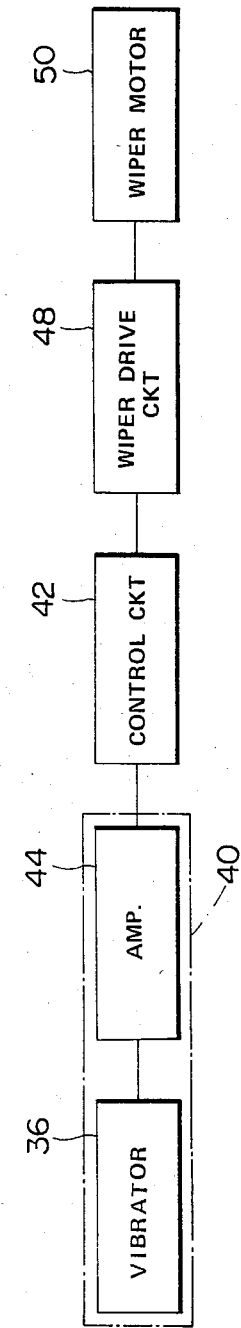
FIG. 3 is a block diagram of a wiper control system including the rain sensor.

The vibrator 36 is associated with a sensor circuit, schematically illustrated in FIG. 3, which is generally represented by the reference numeral "40". This wiper drive control circuit has been disclosed in U.S. Pat. Nos. 4,527,105 and 4,542,325. The disclosure of the aforementioned patents is hereby incorporated by reference.

In summary, the vibration indicative signal produced by the vibrator 36 is fed to a control circuit 42 via an amplifier 44 which is adapted to amplify the vibration indicative signal level sufficiently for application to the control circuit. The control circuit processes the amplified vibration indicative signal to derive the operational timing of a front windshield wiper 46 in accordance with detected rain conditions. In the shown embodiment, the control circuit 42 determines the intervals between intermittent operation of the wiper 46 while operating in INTERMITTENT mode. However, it would also be possible to control the wiper operation by varying the wiper speed according to rain conditions detected even when the wiper is operated in LOW-speed mode and/or HIGH-speed mode.

In the case of controlling the intermittent operation interval, the control circuit 42 outputs a driver signal whenever a summed or counted vibration indicative signal value becomes equal to or greater than a predetermined value. A driver circuit 48 is connected to the control circuit 42 to receive the driver signal to actuate a wiper motor 50 for one cycle of wiper operation each time the driver signal is received.

Figure 4:
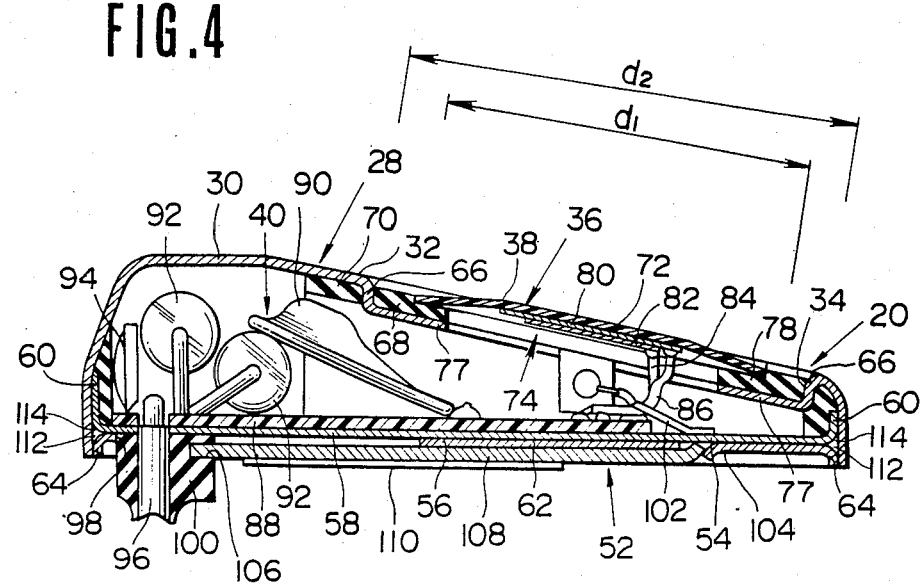
FIG. 4 is a longitudinal section of the first embodiment of the rain sensor taken along line A—A of FIG. 2.

FIG. 4 shows the detailed structure of the first embodiment of the rain sensor according to the present invention. The upper cover member 30 of the sensor casing engages a lower base member which is generally represented by the reference numeral "52" to form a waterproof sensor casing. The lower base member 52 comprises a first base 54 and a second base 56. The first base 54 is adapted to support the sensor circuit including the amplifier 44 and the control circuit 42. The first base 54 has a horizontal major section 58 and a circumferential flange 60 which turns upwards from the circumferential edge of the major section. The second base 56 also has a horizontal major section 62 mating with the lower surface of the major section 58 of the first base 54, and a circumferential flange 64 bent downwards from the circumferential edge of the major section. The mating surfaces of the first and second bases 54 and 56 are bonded together.

The upper cover member 30 is formed with a downwardly or inwardly bent flange 66 extending along the circumferential edge of the opening 34. An elastic or resilient member 68 is fitted to the lower or inner surface 70 of the upper cover member 30 around the circular opening 34. The elastic member is fixed to the mating surface by way of vulcanization and engages the flange 66. The elastic member also engages the flange 60 of the first base 54 to establish a water-proof seal therebetween.

Figure 5:
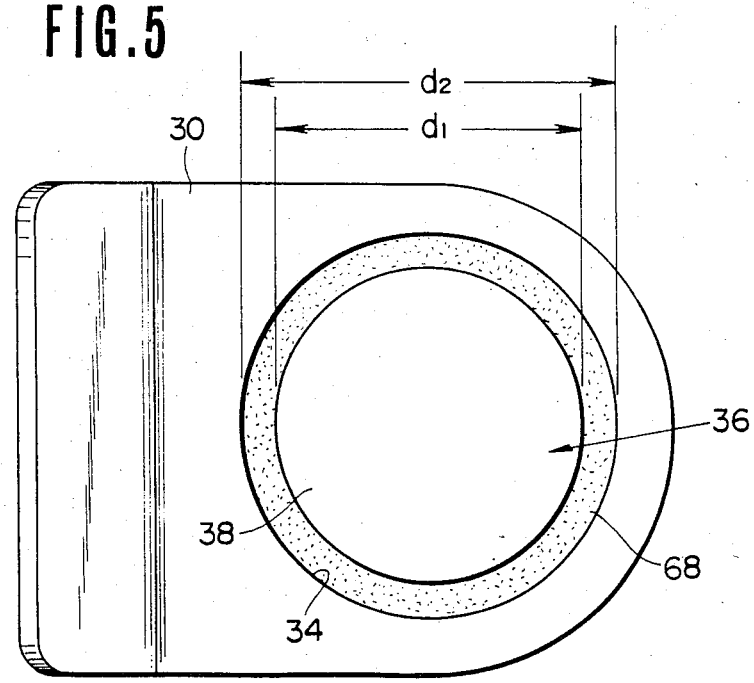
FIG. 5 is a plan view of the rain sensor of FIG. 4.

As shown in FIGS. 4 and 5, the vibrator 36 comprises a vibration plate 72 in the form of a circular disc and a vibration detector member 74 secured to the lower surface of the vibration plate. The vibration plate 72 has a smaller diameter $d_1$ than that ($d_2$) of the circular opening 34 in the upper cover member 30. The circumferential edge of the vibration plate 72 is fixedly secured to the elastic member 68 by way of vulcanization so that it remains free to vibrate or oscillate in response to collision of rain drops onto the exposed surface 38. The elastic member 68 is supported by a plurality of extension strips 77 axially extending from the circumferential edge of the opening 34. The extension strips 77 are located opposite the circumferential edge of the vibration plate 72 where the latter is vulcanized to the circumferential edge 78 of the elastic member 68. The extension strips 77 are adapted to restrict the vibration of the vibration plate 72 through the elastic member in order to define a resonating frequency of the vibrator 36 suitable for detecting rain conditions and to avoid the influence of vehicle body vibrations in cooperation with the elastic rubber. The extension strips 77 are further intended to act as a stopper to restrict the travel of the vibrator 36 in response to external forces on its exposed surface. This satisfactorily and successfully prevents the elastic rubber around the vulcanized portion from being damaged by excessive movement of the vibration plate in response to external forces applied thereto.

Figure 6:
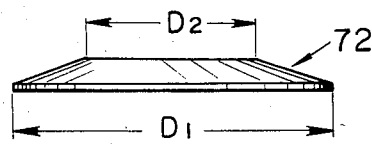
FIG. 6 is an enlarged side view of a vibration plate used in the first embodiment of rain sensor of FIG. 4.
Figure 7:
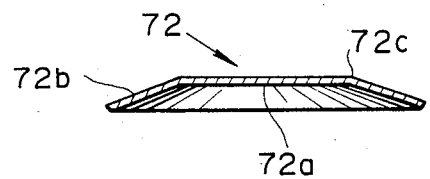
FIG. 7 is a cross section of the vibration plate of FIG. 6.
Figure 8:
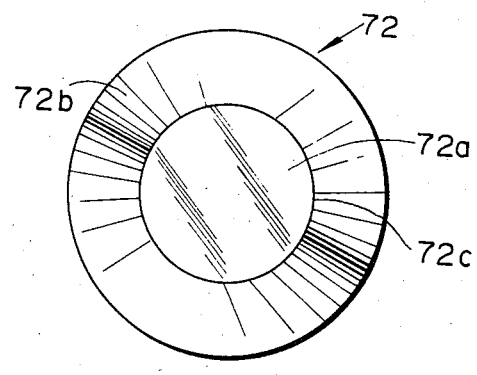
FIG. 8 is a plan view of the vibration plate of FIG. 6.

As particularly shown in FIGS. 6 to 8, the vibration plate 72 has an essentially dish-shaped configuration with a substantially disc-shaped central section 72a and a canted circumferential section 72b meeting along a circular seam 72c. This seam serves as a node defining the secondary resonant frequency of the vibration plate. In the shown embodiment, the vibration plate 72 is designed to have an overall diameter $D_1$ ($=d_1$) which is smaller than that ($d_2$) of the circular opening 34. and a smaller diameter $D_2$ at the central portion 72a. The dimensional relationship between the overall diameter $D_1$ and the diameter $D_2$ of the central portion 72a is arranged to realize a secondary resonant frequency higher than the audible frequency range. Naturally, the vibration plate 72 is adapted to resonate at the secondary resonant frequency as a whole.

By setting the secondary resonant frequency in a range outside of the audible frequency range, vibrations due to vehicle vibrations generated when doors are opened or closed, due to engine vibrations and so forth transmitted through the vehicle body will not influence detection of rain conditions. Furthermore, by forming the vibration plate in the shape set forth above, the thickness thereof can be maintained thin enough to ensure sufficient sensitivity to satisfactorily and successfully detect rain conditions even under light or misty rain conditions.

As shown in FIG. 4, the vibration detector member 74 is attached or bonded to the lower surface of the central portion (72a in FIGS. 7 and 8) of the vibration plate 72 and comprises an electrically conductive plate 80 in intimate contact with the lower surface of the vibration plate 72, and a piezoelectric element 82 attached to the conductive plate 80. The piezoelectric element 82 is bonded to the lower surface of the conductive plate 80 by means of an appropriate glue or adhesive. The conductive plate 80 and the piezoelectric element 82 are connected to the sensor circuit 40 to supply the vibration indicative signal produced in response to vibrations due to collision of rain drops on the exposed surface 38 of the vibration plate 72, via conductive wires 84 and 86 respectively.

The sensor circuit 40 comprises a plated printed circuit board 88 with an integrated circuit 90, capacitors 92, a resistor 94 and so forth. The plated printed circuit board, the integrated circuit 90, the capacitors 92, the resistor 94 and so forth form the amplifier 44. The control circuit 42 is also housed in the sensor casing 28. The control circuit 42 in the sensor casing 28 is connected to the driver circuit 48 provided with the driver motor 50 outside of the sensor casing by means of a conductive wire 96. The conductive wire 96 extends through an opening 98 formed in the second base 56 and through a rubber grommet 100.

In the preferred embodiment, the upper cover member 30 and the lower base member 52 are made of electrically conductive materials and are connected to each other by means of a conductive wire 102. In this way, the sensor casing 28 as an assembly is grounded to the vehicle body to eliminate external or background noises to the sensor.

As shown in FIG. 4, the second base 56 is formed with a downwardly bend strip portion 104 along its inner circumferential edge. In addition, the grommet 100 is formed with a recess 106 in its outer periphery. A fitting bracket 108 with adhesive tape 110 stuck to its lower surface is simultaneously engageable with the strip portion 104 and the recess 106 of the grommet 100. The fitting bracket 108 is fixedly secured to the appropriate portion of the engine hood or cowl top panel by the adhesive tape 110. Thus, by engagement of the strip portion 104 and the recess 106 of the grommet with the fixing bracket 108, the sensor casing 28 is releasably secured to the engine hood or the cowl top panel.

It should be appreciated that although the shown embodiment has three elastic supports arranged to elastically support the vibrator and restrict its downward movement, the number of elastic supports and the shape of each elastic support are not limitted to those of the shown embodiment. Furthermore, although the elastic supports in the shown embodiment are in constant contact with the vibrator to elastically support the latter in co-operation with the elastic member, it would be possible to position the top of the elastic support opposite and slightly separated from the lower surface of the vibrator. In this case, the elastic supports may serve only as stoppers for vibrator to restrict its downward movement.

In the preferred structure, a sealer 112 is provided in a space 114 defined between the first and second bases 54 and 56. This sealer 112 acts to establish a water-proof seal between first and second bases and the internal periphery of the upper cover member, and between the first and second bases themselves.

The rain sensor 20 constructed as set forth above can be released from the engine hood or the cowl top panel to which it is fixed by disengaging the fixing bracket from the strip portion of the second base and the recess of the grommet. In this case, the fixing bracket will remain on the engine hood or the cowl top panel so that the sensor casing may again be installed.

In the rain sensor operation, since the vibrator 36 is elastically supported by the elastic rubber, the vibrations transmitted through the vehicle body to the sensor casing can be satisfactorily and successfully absorbed by the elastic rubber. Therefore, even when the vehicle body vibrates or oscillates due to engine vibrations, road shocks transmitted through the suspension mechanism, shocks generated when the doors are opened or closed, and so forth, the vibrator will vibrate only when rain drops hit or impinge on the exposed surface thereof with adequate force. Therefore, the vibration indicative signal will have a value accurately corresponding to rain conditions. As a result, the wiper intermittent operation control will exactly correspond to rain conditions.

Figure 9:
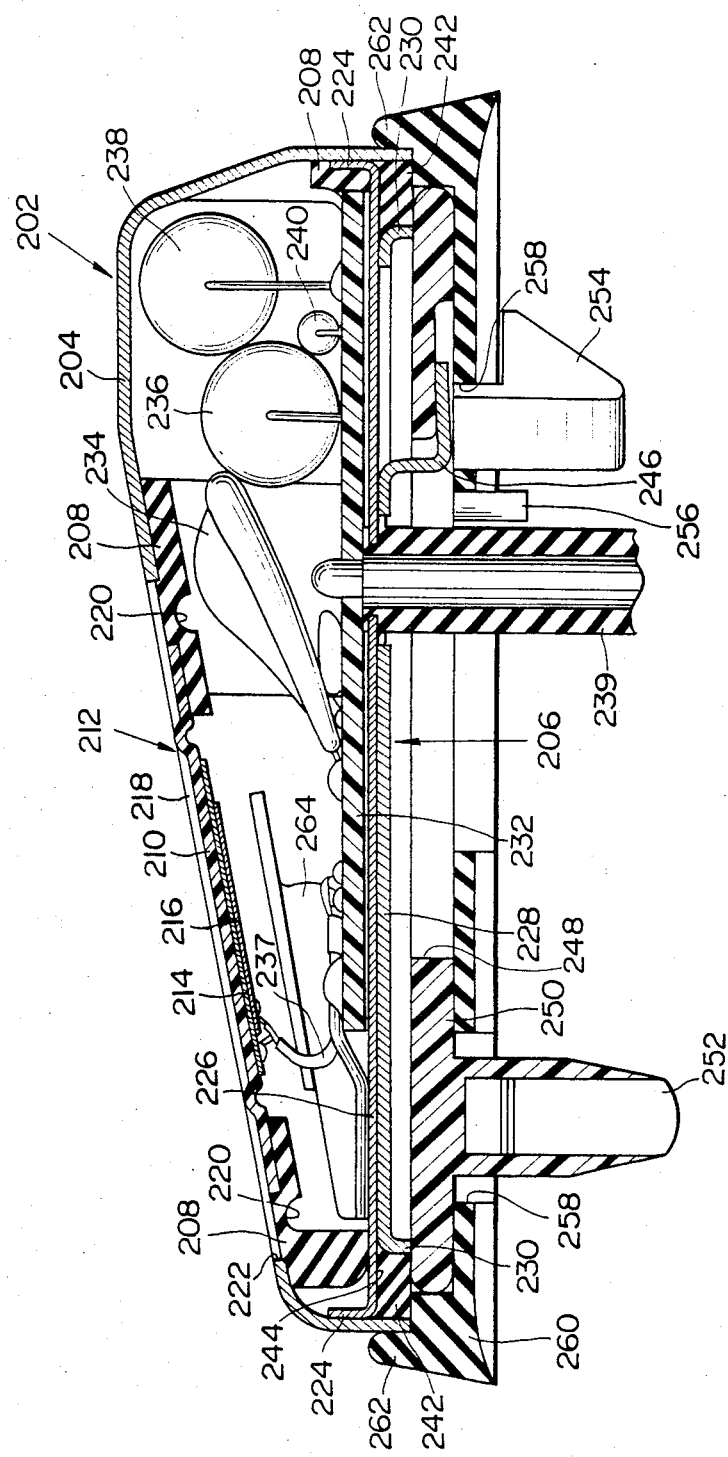
FIG. 9 is a longitudinal section of the second embodiment of the rain sensor according to the present invention.

The second embodiment of the rain sensor according to the present invention is illustrated in FIGS. 9 to 12. In this second embodiment, a sensor casing 202 comprises an upper cover member 204 and a lower base member 206, as in the aforementioned first embodiment. An elastic rubber 208 is vulcanized onto the inner or lower surface of the upper cover member 204 and is also vulcanized onto the lower surface of a vibration plate 210 which constitutes a vibrator 212 together with an electrically conductive plate 214 and a piezoelectric element 216. The elastic member 208 thus elastically supports the vibrator 212, so that the vibrator 212 will be free to vibrate or oscillate in response to the energy of collision or impact of rain drops onto the exposed upper or outer surface 218 of the vibration plate. In the embodiment of FIG. 9, the elastic member 208 is formed with a groove 220 extending along the circumferential edge of a circular opening 222. This groove 220 serves to add flexibility to the elastic member to ensure that it will satisfactorily absorb vibrations transmitted through the vehicle body and to amplify the magnitude of vibrator vibrations to a sufficient level.

As particularly shown in FIGS. 10 to 12, the vibration plate 210 is formed with a circular projecting rib 210a concentric with and inside the circumferential edge. The rib 210a defines a flat central portion 210b which has a diameter $D_2$. The dimensions of the central portion 210b are so related to the overall diameter $D_1$ of the vibration plate 210 as to realize a secondary resonant frequency outside of the audible frequency range. Similar to the seam of the aforementioned first embodiment, the rib 210a serves as a node defining the secondary resonant frequency.

The upper cover member 204 is engageable in waterproof fashion to the lower base member 206. The waterproof connection is established by the elastic member 208 engaging the upwardly bent flange 224 of a first base 226. A second base 228 with downwardly bent flange 230 is fixedly attached to the lower surface of the first base 226 by means of an appropriate adhesive. The first base 226 supports a plated printed circuit board 232 which includes an integrated circuit 234, capacitors 236 and 238, a resistor 240 and so forth. The integrated circuit 234, the capacitors 236 and 238 and the resistor 240 constitute the amplifier 44 of FIG. 3. The plated printed circuit board 232 also includes the control circuit 42 of FIG. 3 which produces the driver signal based on the detected rain conditions.

The conductive plate 214 and the piezoelectric element 216 are connected to the amplifier 44 through an electrically conductive wire 237. In addition, the control circuit 46 is connected to the wiper driver circuit 48 via an electrically conductive wire which extends through an elastic grommet 239. The upper cover member 204 is connected to the printed circuit board 232 via a lead and the base 206 is connected to the printed circuit board 232 via a conductive welding. A grounding wire (not shown) connected to the printed circuit board 232 passes through the grommet 239 to external ground. With this arrangement, the upper cover member and the lower base member are grounded to eliminate external and/or background noises to the rain sensor.

A sealer 242 fills in the space 244 defined by the first and second bases 226 and 228 and the upper cover member 204. This sealer 242 ensures that the sensor casing will be waterproof and thus protects the internal circuitry in the sensor casing.

As best shown in FIG. 9, the second base has a bent hook portion 246 engageable with an opening 248 formed in a fastener plate 250. The fastener plate 250 is provided with three hooks 252, 254 and 256 extending downwards from its lower surface. Each hook 252, 254 and 256 of the fastener plate 250 extends through a corresponding through opening 258 formed in a rubber mat 260 with a circumferential, upwardly-extending wall 262. The hooks 252, 254 and 256 are adapted to resiliently engage the vehicle body in order to secure the sensor casing 202 to the rubber mat 260 and so to the vehicle body. Alternatively, the rubber mat 260 may be elastically attached to the engine hood or cowl top panel to establish water-tight engagement therebetween. The peripheral wall 262 of the rubber mat 260 is adapted to snugly fit the outer periphery of the upper cover member 204 in order to establish a water-proof seal therebetween.

The first base 226 is bent upwards along its lateral edges to form upward extensions 264 which serve as a stopper for the vibrator to restrict its downward movement. The upper end of the upper extensions 264 are accordingly positioned a given distance below the vibration plate 210. As in the aforementioned first embodiment, the extension 264 may prolong the life of the elastic rubber by preventing excessive downward movement of the vibrator even when relatively strong external forces are applied thereto.

As set forth hereabove, according to the present invention, the vibration plate of the vibrator can be formed thin enough to ensure sufficient sensitivity of rain condition detection by facilitating vibration or oscillation of the vibrator in response to the impact of rain drops. At the same time, the vibrator according to the present invention can satisfactorily and successfully avoid the influence of vehicle vibrations generated by the opening and closing of the vehicle doors, by engine vibrations, horn sound vibrations and so forth. As set forth above, vibrations generated by such vehicle operations will fall within the range of audible frequencies, i.e., no higher than 9 KHz, since higher frequencies tend to be absorbed during transmission through the vehicle body. Therefore, by setting the resonant frequency of the vibration plate outside of the audible frequency range, the influence of such vehicle vibrations can be avoided.

FIG. 13(A) shows the distribution of vibration amplitude across a substantially flat vibration plate and FIG. 13(B) shows the corresponding distribution of vibration amplitude across the vibration plates of the foregoing first and second embodiments. As will be apparent, by providing the bent portion or rib, the area of the oscillating portions of the vibration plate is reduced, causing the resonant frequency to be higher than audible frequencies.

Although specific embodiments have been described in order to disclose the present invention in detail, the invention should not be understood or interpreted as being limited to those specific embodiments. Rather, the invention must be interpreted as including all possible modifications and embodiments of the invention regardless of whether disclosed herein. For example, although the vibration plate has been disclosed in the form of a circular disc, it can be modified to be in any shape appropriate for detecting rain conditions, such as an oval shape.

What is claimed is:

1. A rain sensor for an automotive wiper control system, comprising:
   a sensor housing;
   a vibrator with a sensor surface onto which rain drops can impinge and suspended in said sensor housing for vibration in response to the impact of rain drops onto the sensor surface, the resonant frequency of said vibrator being in a range outside of the vibration frequency range within which vibrations may be transmitted through the vehicle body;
   means for converting the vibrator vibrations into electric signals which vary according to the variation of the vibrator vibrations;
   wherein the resonant frequency of the vibrator is higher than the audible frequency range; and
   wherein said vibrator is of disc-shaped configuration having a flat central portion and a canted circumferential portion.

2. The rain sensor as set forth in claim 1, wherein said vibrator has a bent seam between said flat central portion and a canted circumferential portion.

3. The rain sensor as set forth in claim 2, which further comprises a resilient member for elastically supporting the vibrator within said sensor housing.

4. The rain sensor as set forth in claim 3, which further comprises a stopper means for limiting the movement of said vibrator to within a given range.

5. The rain sensor as set forth in claim 4, wherein said stopper means comprises a plurality of radially extending strips extending from the sensor housing below the vibrator for restricting the downward movement of the vibrator to within said given motion range.

6. The rain sensor as set forth in claim 5, wherein each of said stopper means includes an elastic member with a top in continuous contact with the lower surface of said vibrator for resiliently supporting the latter, said elastic member allowing said vibrator to vibrate in response to the impact of rain drops.

7. A rain sensor for an automotive wiper control system, comprising:
   a sensor housing;
   a vibrator with a sensor surface onto which rain drops can impinge and suspended in said sensor housing for vibration in response to the impact of rain drops onto the sensor surface, the resonant frequency of said vibrator being in a range outside of the vibration frequency range within which vibrations may be transmitted through the vehicle body;
   means for converting the vibrator vibrations into electric signals which vary according to the variation of the vibrator vibrations;
   wherein the resonant frequency of the vibrator is higher than the audible frequency range; and wherein said vibrator is of a generally discshaped configuration with a projecting rib concentric to and inside the circumferential edge of said vibrator, said rib defining the resonant frequency of the vibrator.

8. The rain sensor as set forth in claim 7, which further comprises a resilient member elastically supporting said vibrator within said sensor housing.

9. The rain sensor as set forth in claim 8, which further comprises a stopper means for restricting the travel of said vibrator to within a given motion range.

10. The rain sensor as set forth in claim 9, wherein said stopper means comprises a plurality of extension strips located below said vibrator and defining the lower limit of downward movement of said vibrator.

11. The rain sensor as set forth in claim 10, wherein each of said extension strips includes an elastic cushion in continuous contact with the lower surface of vibrator, which elastic cushion is flexible enough to allow the vibrator to vibrate in response to the impact of rain drops.

12. A rain sensor for an automotive wiper control system, comprising:
   a sensor housing;
   a vibrator with a sensor surface onto which rain drops can impinge and suspended in said sensor housing for vibration in response to the impact of rain drops onto the sensor surface, the resonant frequency of said vibrator being in a range outside of the vibration frequency range within which vibrations may be transmitted through the vehicle body;
   means for converting the vibrator vibrations into electric signals which vary according to the variation of the vibrator vibrations;
   wherein the resonant frequency of the vibrator is higher than the audible frequency range; and
   wherein said vibrator is of a generally discshaped configuration with a rib projecting from one surface of said vibrator for defining the resonant frequency of said vibrator outside of the audible frequency range.

13. A rain sensor for an automotive wiper control system, having a sensor surface exposed outside at a position adjacent a front windshield and adapted to produce a sensor signal representative of a magnitude of impact of rain drops on said sensor surface, and thus indicative of rain conditions, comprising:
   a sensor housing;
   a vibrator having said sensor surface and suspended in said sensor housing for vibration in response to the impact of the rain drops onto the sensor surface, said vibrator being formed of a single piece of essentially flat plate with a bend extending around said essentially flat sensor surface, said bend being so formed as to determine a resonant frequency of said vibrator outside of the vibration frequency range within vibrations may be transmitted through the vehicle body; and
   means for converting the vibrator vibrations into said sensor signal.

14. A rain sensor for an automotive wiper control system which is adapted to control wiper operation depending upon rain conditions, said rain sensor having a sensor surface exposed outside of the vehicle and positioned adjacent a windshield of the vehicle, and adapted to produce a sensor signal representative of impact exerted by rain drop onto said sensor surface, comprising:
   a hollow sensor housing;
   a vibrator of generally disc-shaped configuration and having said sensor surface in substantially flat section, the periphery of said vibrator being resiliently suspended within said sensor housing for oscillation depending upon impact exerted by the rain drops, and said vibrator having a bent section extending substantially along said periphery, said bent section being so arranged as to place the resonant frequency of said vibrator in a frequency range outside of a resonant frequency range of the vehicle body; and
   means for converting the vibrator vibrations into said sensor signal.

* * * * *